UNITED STATES PATENT OFFICE.

WILLIAM PAINTER, OF BALTIMORE, MARYLAND, ASSIGNOR TO THE CROWN CORK AND SEAL COMPANY, OF BALTIMORE, MARYLAND.

GLUTEN COMPOUND.

SPECIFICATION forming part of Letters Patent No. 684,522, dated October 15, 1901.

Application filed February 20, 1899. Renewed March 21 1901. Serial No. 52,246. (No specimens.)

*To all whom it may concern:*

Be it known that I, WILLIAM PAINTER, a citizen of the United States, residing at Baltimore, Maryland, have invented certain new and useful Improvements in Gluten Compounds, of which the following is a specification.

In a specification filed by me on the 3d of October, 1898, Serial No. 692,538, I have described and claimed a process of preparing a compound consisting of gluten, glycerin, and a body material, so as to cause the glycerin to so thoroughly permeate the granules of the body material as to prevent the glycerin from being dissolved out of the compound where a long-continued contact with watery liquids is had. The subject-matter of the case referred to relates to the process, while in the present case the compound is claimed. As stated in my former application, I aim to counteract this tendency of glycerin to dissolve out of the compound, and to this end instead of merely incorporating the glycerin with the gluten or with the body material, as described in an application filed by me January 14, 1898, Serial No. 666,664, I first soak the body material in a hot weak solution of glycerin in water, then evaporate it to dryness at a temperature below that at which glycerin vaporizes, thus causing the glycerin the more completely to permeate the granules of said body material. I have found that in the mere mixing or incorporation of certain proportions of glycerin and a body material generally or of glycerin with gluten and these with a body material the glycerin in many cases does not to any extent permeate the granules of body material; but if these granules are subjected to a hot weak solution of glycerin in water the permeating action of the hot water carries with it mechanically the small proportion of glycerin required, and as the water vaporizes at a much lower temperature than glycerin it may afterward be eliminated by evaporation, leaving the glycerin as thoroughly permeating the granules of body material. I then add under a gentle heat and thoroughly incorporate with the gluten and the glycerin-processed body material a melted compound of some suitable resinous or pitchy and an oily, fatty, or waxy substance, the proportions of which will largely determine the final hardness of the product, while being insoluble in watery liquids. The effect of this method is, first, to thoroughly permeate the granules of body material with glycerin, and then by the thorough incorporation of the melted mixture of resin or pitch and fat or wax with the plastic gluten envelop these granules of body material with an insoluble protecting film which prevents the dissolving out of the glycerin when the compound is brought into prolonged contact with watery liquids. For some purposes it is indispensable that the compound shall contain no ingredient having any perceptible odor or flavor, so that it may not impart such odor or flavor to liquids with which it may come in contact. In such cases, while any resinous or pitchy substance combined or melted with any oleaginous or waxy matter will subserve the purpose of protecting the glycerin in the body material from being dissolved out and will aid in producing the required softness in the compound, I prefer to use for the resinous ingredient the inert neutral resin manufactured from ordinary rosin, known in the arts as "ester-gum," and for the oleaginous or waxy material vaseline, paraffin, mineral wax, or stearic acid, all of which are practically tasteless and odorless. When odor or flavor is of no consequence, I may use for the resinous or pitchy material ordinary rosin, pitch, or asphaltum.

In some cases I find it advantages to incorporate the glycerin with the gluten instead of glycerizing the body material, and in still others to incorporate the glycerin with the melted compound of resinous or pitchy and fatty or waxy substances. In either of the two latter cases the introduction of the melted compound of resinous or pitchy and fatty or waxy matter measurably resists the dissolving of the glycerin out of the product when brought into prolonged contact with watery liquids.

As an example of the compound, first I subject three pounds of granulated or pulverized cork to treatment in a hot solution of glycerin in water in the proportion of one pound of glycerin to ten of water for about thirty minutes, then evaporate the cork to dryness under a temperature of about 200°

Fahrenheit. I then melt three pounds of ester-gum with one pound of vaseline. I then incorporate these two mixtures under gentle heat with about five pounds of gluten in the plastic state. After incorporation I roll or mold the product into the desired form and subject the whole to heat at about 200° to 250° Fahrenheit for several hours. Upon removal from the oven when cold it is ready for use.

In a second instance, taking the same proportions of all the ingredients, I first incorporate the glycerin with the gluten, then add the melted compound of ester-gum and vaseline, and finally incorporate the unglycerized granulated cork. In a third instance, with the same proportions, I first incorporate the glycerin with the melted compound of ester-gum and vaseline, then incorporate therewith the gluten, and finally incorporate with the whole the unglycerized granulated cork.

I claim—

1. A compound consisting of glycerin, gluten, a non-drying insoluble softening material and a body material.

2. A compound consisting of gluten, a glycerized body material and a non-drying insoluble softening material, substantially as described.

3. The herein-described process, consisting in mixing together gluten, a body material and a non-drying insoluble softening material, one of said materials being first intimately mixed with glycerin, substantially as described.

In testimony whereof I affix my signature in presence of two witnesses.

WILLIAM PAINTER.

Witnesses:
JOHN T. HAWKINS,
W. H. WHEELER.